United States Patent
Meiyappan et al.

(10) Patent No.: US 7,894,779 B2
(45) Date of Patent: Feb. 22, 2011

(54) APPARATUS AND METHOD FOR TRANSMITTING AND RECEIVING MULTIPLE RADIO SIGNALS OVER A SINGLE ANTENNA

(75) Inventors: Palaniappan Meiyappan, Bellevue, WA (US); Alfonso Malaga, Sammamish, WA (US); Chad E. Wilson, Sammamish, WA (US)

(73) Assignee: Honeywell International Inc., Morristown, NJ (US)

( * ) Notice: Subject to any disclaimer, the term of this patent is extended or adjusted under 35 U.S.C. 154(b) by 552 days.

(21) Appl. No.: 11/765,207

(22) Filed: Jun. 19, 2007

(65) Prior Publication Data

US 2008/0107093 A1    May 8, 2008

Related U.S. Application Data

(60) Provisional application No. 60/815,796, filed on Jun. 22, 2006.

(51) Int. Cl.
*H04B 1/44* (2006.01)
(52) U.S. Cl. ...................................... 455/83
(58) Field of Classification Search ................... 455/78, 455/83, 553.1
See application file for complete search history.

(56) References Cited

U.S. PATENT DOCUMENTS

| | | | |
|---|---|---|---|
| 3,781,684 A | 12/1973 | Inslerman | |
| 4,375,622 A | 3/1983 | Hollingsworth et al. | |
| 4,970,479 A | 11/1990 | Landt et al. | |
| 5,032,804 A | 7/1991 | Hollingsworth | |
| 5,212,813 A * | 5/1993 | Renaud | 455/82 |
| 5,267,234 A | 11/1993 | Harrison | |
| 5,574,978 A * | 11/1996 | Talwar et al. | 455/63.1 |
| 5,880,648 A | 3/1999 | Aves et al. | |
| 5,974,301 A * | 10/1999 | Palmer et al. | 455/63.1 |
| 6,643,522 B1 * | 11/2003 | Young | 455/552.1 |
| 6,934,562 B1 | 8/2005 | Wilding | |
| 7,102,699 B2 | 9/2006 | Rodolico | |
| 7,447,519 B2 * | 11/2008 | Axness et al. | 455/552.1 |
| 2002/0130734 A1 | 9/2002 | Liang et al. | |
| 2003/0125004 A1 | 7/2003 | Tolson | |

(Continued)

FOREIGN PATENT DOCUMENTS

WO    2004098085    11/2004

*Primary Examiner*—Matthew D Anderson
*Assistant Examiner*—David Bilodeau
(74) *Attorney, Agent, or Firm*—Fogg & Powers LLC

(57) ABSTRACT

An apparatus for transmitting and receiving multiple radio frequencies simultaneously over a single antenna is provided. The apparatus comprises a transmitter signal combining apparatus configured to communicatively couple with a plurality of transmitters, wherein the transmitter signal combining apparatus is configured to output a transmission signal based on any signals received from the plurality of transmitters. The apparatus also includes at least one transmit/receive signal duplexer coupled to the transmitter signal combining apparatus and configured to provide the transmission signal to an antenna, wherein the antenna receives an incoming radio frequency (RF) signal. Additionally, the apparatus includes a signal separation apparatus coupled to the at least one transmit/receive signal duplexer and configured to receive the incoming RF signal and provide the incoming RF signal to at least one receiver. Wherein the at least one transmit/receive signal duplexer is further configured to provide the incoming RF signal to the signal separation apparatus, and limit a direct coupling of the transmission signal into the signal separation apparatus.

18 Claims, 13 Drawing Sheets

U.S. PATENT DOCUMENTS

| | | |
|---|---|---|
| 2003/0177499 A1 | 9/2003 | Rodolico |
| 2004/0052272 A1 | 3/2004 | Frank |
| 2004/0137947 A1 | 7/2004 | Nimmo-Smith |
| 2004/0142700 A1 | 7/2004 | Marinier |
| 2004/0176034 A1 | 9/2004 | Hunter et al. |
| 2009/0054008 A1* | 2/2009 | Satou .......................... 455/78 |

* cited by examiner

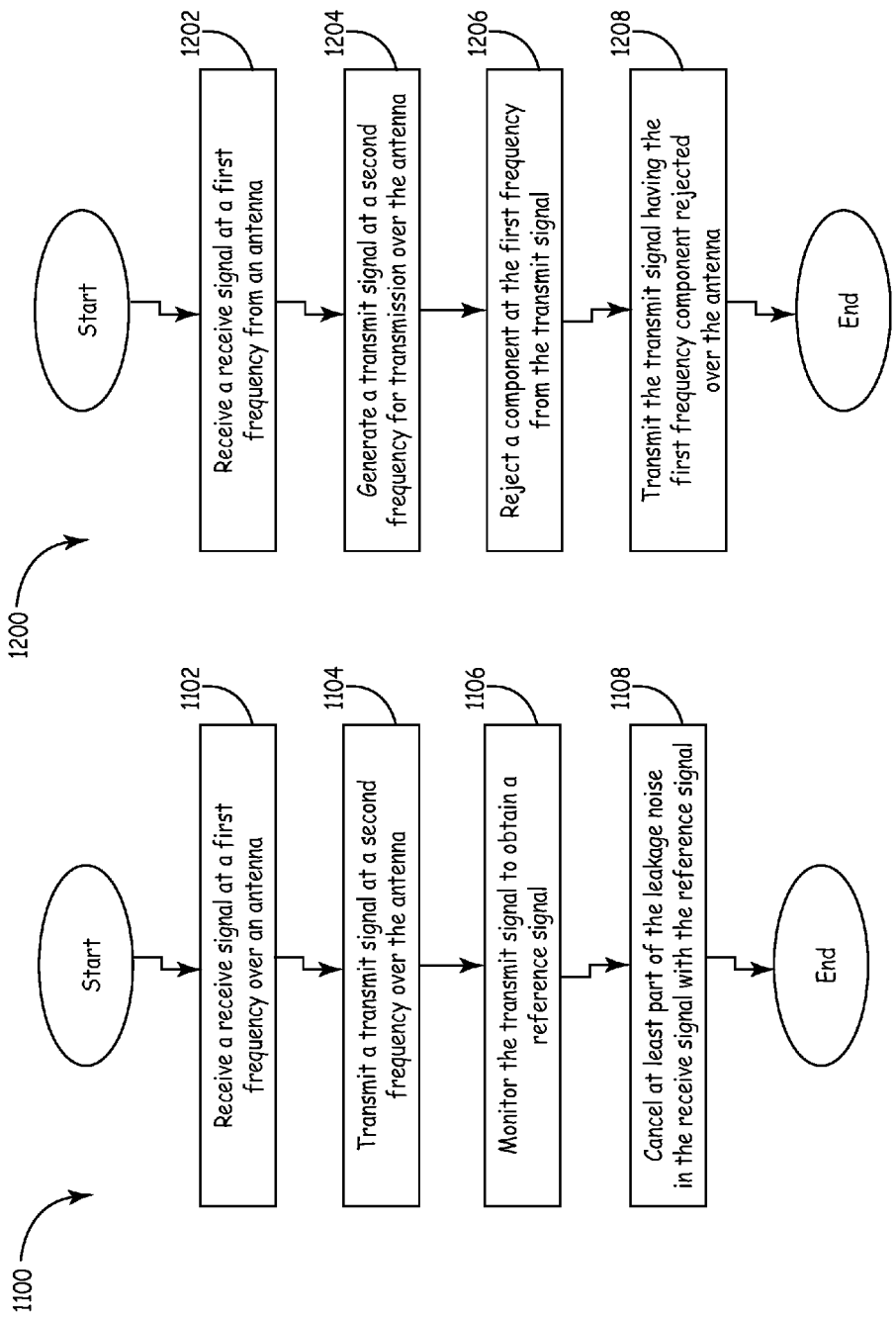

APPARATUS AND METHOD FOR TRANSMITTING AND RECEIVING MULTIPLE RADIO SIGNALS OVER A SINGLE ANTENNA

This application claims the benefit of U.S. Provisional Application No. 60/815,796, filed on Jun. 22, 2006, which is hereby incorporated herein by reference.

CROSS REFERENCE TO RELATED APPLICATIONS

This application is related to U.S. patent application Ser. No. 11/765,210 having a title of "APPARATUS AND METHOD FOR IMPROVING RECEPTION IN A SYSTEM WITH MULTIPLE TRANSMITTERS AND RECEIVERS OPERATING ON A SINGLE ANTENNA" filed on the same date herewith.

BACKGROUND

Designers of next generation vehicles of all types are striving to design lighter, smaller, and easier to repair vehicles. To accomplish these goals the communication systems within the vehicles must also be lighter, smaller, and easier to repair. One way to achieve these goals in systems with multiple radio communication means is to have multiple transmitters and receivers operate over the same antenna. Combining multiple transmitters and receivers onto a single antenna reduces the number of antennas that need to be placed on the vehicle without sacrificing functionality. The combination also leads to integration of electronics, which reduces the size, weight, and number of components of the system. Combining multiple transmitters and receivers onto a single antenna, however, presents its own difficulties, especially when the transmitters and receivers operate within the same frequency band.

Currently, there are conventional devices which transmit and receive simultaneously on different channels in separate frequency bands over a single antenna. These conventional devices accomplish this by separating the transmit and receive frequency bands with many megahertz of bandwidth. Because the transmit and receive frequency bands are so separated, conventional filters can be used to separate the receive frequencies from the transmit frequencies.

In some communication systems, however, combining transmitters and receivers is not so easy. For example, in some aircraft communication systems, the radios transmit and receive on the same frequency, as in a push-to-talk type system. Additionally, there are multiple transmitters (and receivers) that operate within the same frequency band. In this situation, a conventional system cannot filter out a transmitted signal on a first channel from a received signal on a second channel within the same frequency band, because the transmitted signal and the receive signal are so near in frequency. The transmitted signal is of a higher power than the received signal and it saturates any active signal processing elements and masks any signals received on the second channel. Thus, connecting multiple transmitters and receivers to a single antenna in a conventional system does not allow simultaneous use of transmitters and receivers of different channels within the same frequency band. When the communications systems require independent simultaneous use of two transmitters or two receivers, simply connecting multiple transmitters and receivers to an antenna is unacceptable.

For the reasons stated above, and for other reasons stated below which will become apparent to those skilled in the art upon reading and understanding the present specification, there is a need in the art for an apparatus and method for simultaneously transmitting and receiving multiple radio signals within the same frequency band over a single antenna.

SUMMARY

The above-mentioned problems of current systems are addressed by embodiments of the present inventions and will be understood by reading and studying the following specification. The following summary is made by way of example and not by way of limitation. It is merely provided to aid the reader in understanding some of the aspects of the inventions. In one embodiment, an apparatus for transmitting and receiving multiple radio frequencies simultaneously over a single antenna is provided. The apparatus comprises a transmitter signal combining apparatus configured to communicatively couple with a plurality of transmitters, wherein the transmitter signal combining apparatus is configured to output a transmission signal based on any signals received from the plurality of transmitters. The apparatus also includes at least one transmit/receive signal duplexer coupled to the transmitter signal combining apparatus and configured to provide the transmission signal to an antenna, wherein the antenna receives an incoming radio frequency (RF) signal. Additionally, the apparatus includes a signal separation apparatus coupled to the at least one transmit/receive signal duplexer and configured to receive the incoming RF signal and provide the incoming RF signal to at least one receiver. Wherein the at least one transmit/receive signal duplexer is further configured to provide the incoming RF signal to the signal separation apparatus, and limit a direct coupling of the transmission signal into the signal separation apparatus.

BRIEF DESCRIPTION OF THE DRAWINGS

The present inventions can be more easily understood, and further advantages and uses thereof are more readily apparent, when considered in view of the detailed description and the following figures in which:

FIG. 11 is a flow chart of a method for transmitting and receiving multiple frequencies over a single antenna of one embodiment of the present inventions; and FIG. 12 is a flow chart of another method for transmitting and receiving multiple frequencies over a single antenna of one embodiment of the present inventions;

In accordance with common practice, the various described features are not drawn to scale but are drawn to emphasize specific features relevant to the present inventions. Like reference characters denote like elements throughout the Figures and text.

DETAILED DESCRIPTION

In the following detailed description, reference is made to the accompanying drawings that form a part hereof, and in which is shown by way of illustration specific illustrative embodiments in which the method and system may be practiced. These embodiments are described in sufficient detail to enable those skilled in the art to practice the inventions, and it is to be understood that other embodiments may be utilized and that logical, mechanical and electrical changes may be made without departing from the spirit and scope of the present inventions. The following detailed description is, therefore, not to be taken in a limiting sense.

Embodiments of the present inventions help reduce the volume, weight, and complexity of a communication system by providing for an apparatus for transmitting and receiving multiple radio signals over a single antenna. The apparatus combines multiple transmitters onto a transmit path and at least one receiver onto a receive path. The transmit path and receive path are coupled through a transmit/receive signal duplexer to a single antenna. The multiplexing device limits the amount of signal and noise leaked from the transmitters to the receivers by isolating signals on the transmit path from the receive path. Additionally, a transmitter suppressor monitors the signal on the transmit path to obtain a reference signal which is adjusted and used to cancel out any component of the transmit signal in the receive path. In further embodiments, the receive path includes at least one tunable notch filter which can be set to reject the frequency of a transmitter that is currently transmitting. In other embodiments, each transmitter is followed by at least one notch filter to remove any broadband noise which is present in the signal of the transmitters at the frequency used by the associated receiver(s).

Figure 1:
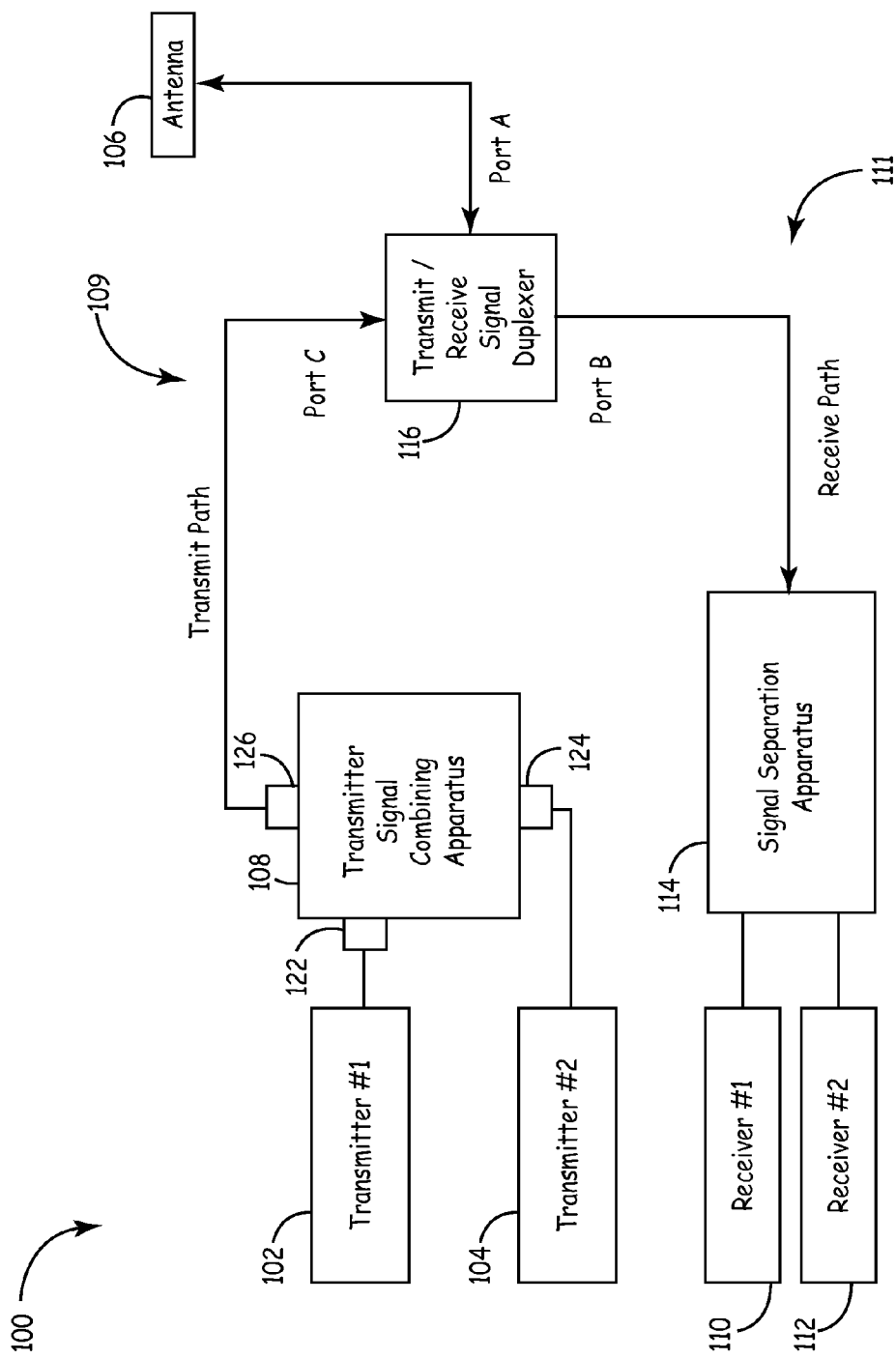
FIG. 1 is a block diagram of an apparatus for transmitting and receiving multiple frequencies over a single antenna of one embodiment of the present inventions.

FIG. 1 is a block diagram of one embodiment of an apparatus 100 for transmitting and receiving multiple radio signals over a single antenna. Apparatus 100 includes a first transmitter 102, a second transmitter 104, a first receiver 110, a second receiver 112, a transmit/receive signal duplexer 116, an antenna 106, and a signal separation apparatus 114. Apparatus 100 transmits and receives multiple frequencies over antenna 106. In the transmit direction, transmission signals are produced by transmitters 102, 104, combined by a transmitter signal combining apparatus 108 and coupled to antenna 106 by a transmit/receive signal duplexer 116. In the receive direction, receive signals (incoming RF signals) are coupled from antenna 106 to signal separation apparatus 114 by transmit/receive signal duplexer 116. Signal separation apparatus 114 then splits the receive signal and couples a respective portion of the receive signal to each receiver 110 and 112 for processing.

First transmitter 102 and a second transmitter 104 each produce a radio frequency (RF) signal for transmission over antenna 106. In this embodiment, first transmitter 102 transmits on a first channel and second transmitter 104 transmits on a second channel. As will be explained in further detail below, apparatus 100 allows first transmitter 102 to operate within the same frequency band as transmitter 104, and at a frequency near the frequency used by second transmitter 104. For example, in one embodiment, first transmitter 102 and second transmitter 104 transmit signals on frequencies in the VHF band (30 Mhz-300 Mhz) and with channels spaced approximately 25 Khz away from each other. Thus, in contrast to conventional systems where the transmit frequencies are separate from the receive frequencies, here either transmitter 102, 104 can transmit on any channel within the VHF band. Likewise, either receiver 110, 112 can receive on any channel within the frequency band. The present inventions, however, are not intended to be so limited, and can include first transmitter 102 and second transmitter 104, along with first and second receivers 110 and 112, operating in frequency bands other than VHF, each operating in their own frequency bands, and/or separation between transmitters/receivers of other amounts of frequency.

Transmitter 102 is coupled to port 122 of transmitter signal combining apparatus 108, and transmitter 104 is coupled to port 124. Transmitter signal combining apparatus 108 sums the signals received on ports 122 and 124 into a composite signal which is output via port 126. Port 126 of transmitter signal combining apparatus 108 is coupled to a port of transmit/receive signal duplexer 116 (shown in FIG. 1 as "Port C"). Another port of transmit/receive signal duplexer 116 (shown in FIG. 1 as "Port A") is coupled to antenna 106. The path of a signal transmitted from either first transmitter 102 or second transmitter 104, propagating through transmitter signal combining apparatus 108 and transmit/receive signal duplexer 116 for transmission over antenna 106 is generally referred to as the "transmit path" as shown generally at 109. In other words, transmit path 109 generates and processes a signal for transmission over antenna 106.

In operation, transmitter signal combining apparatus 108 allows a signal to pass through unchanged when only one of transmitters 102 and 104 is transmitting. When both transmitters 102 and 104 are transmitting, transmitter signal combining apparatus 108 sums the signals received via ports 122 and 124 to create a combined signal that comprises both the signals received via ports 122 and 124. In either case, the resulting output signal from port 126 of transmitter signal combining apparatus 108 is received by transmit/receive signal duplexer 116, which passes the output signal to antenna 106. As is known to those skilled in the art, there are many different options for implementing transmitter signal combining apparatus 108. For example, in one embodiment, transmitter signal combining apparatus 108 is a power amplifier. The power amplifier combines at its input the signals from transmitters 102 and 104, amplifies the combined signal, and sends the combined signal to transmit/receive signal duplexer 116.

The path of a signal received over antenna 106 and propagated through transmit/receive signal duplexer 116 and signal separation apparatus 114 to receivers 110 and 112 is generally referred to as the "receive path" and is shown generally at 111. In operation of receive path 111, a signal received by antenna 106 is provided to Port A of transmit/receive signal duplexer 116. Transmit/receive signal duplexer 116, in turn, outputs that signal via Port B. Transmit/receive signal duplexer 116 also operates to provide signal isolation functionality such that signals received on Port C are passed to Port A for output, but are isolated from Port B, referred to as a reverse path. Similarly, signals received on Port A are passed to Port B for output, but are isolated from Port C. This allows signals from transmitters 102 and 104 to be routed for transmission over antenna 106, and also allows signals received at antenna 106 to be routed for processing by receivers 110, 112, while limiting propagation of signals directly from transmit path 109 to receive path 111.

Although in apparatus 100 a single transmit/receive signal duplexer is shown, the present inventions is not intended to be so limited and can include multiple transmit/receiver duplexers coupled together. For example, in another embodiment, apparatus 100 has two transmit/receive signal duplexers coupled together to increase the isolation along the reverse paths. Two transmit/receiver signal duplexers coupled together, doubles the amount of isolation on the reverse paths. In other embodiments, three or more transmit receive signal duplexers are coupled in parallel to further increase isolation along the reverse paths.

In the particular embodiment shown in FIG. 1, receivers 110 and 112 are each separate standalone units coupled to signal separation device 114. Signal separation device 114 splits the receive signal from antenna 106 and provides receivers 110 and 112 with the split signal. In one implementation of apparatus 100, signal separation apparatus 114 comprises a micro-electrical mechanical systems (MEMS) based diplex filter which separates (tunes) a signal received from antenna 106 into two frequency components. The MEMS filter splits the receive signal into a first component signal for processing by receiver 110 and a second component signal for processing by receiver 112. The MEMS filter enables separation of closely spaced frequencies and directs each component of the receive signal to the appropriate one of receivers 110 and 112. In another embodiment, signal separation apparatus 114 comprises a passive splitter which creates two identical signals from the receive signal. Each of the identical signals is sent to receivers 110 and 112. When this passive splitter is used, each of the receivers 110 and 112 include any functionality required to tune to its designated operating frequency and process on the appropriate channel.

In one implementation of apparatus 100, first transmitter 102 and first receiver 110 operate as a pair and transmit and receive on the same frequency over antenna 106. Thus, similar to a push-to-talk system, first receiver 110 cannot receive over antenna 106 while first transmitter 102 is transmitting because the signal from first transmitter 102 will overpower any signal received on antenna 106 of the same frequency. Second transmitter 104 and second receiver 112 also act as a pair, and therefore also cannot transmit and receive simultaneously. Apparatus 100, however, provides for concurrent operation of a transmitter of one frequency and a receiver of a second frequency. For example, first transmitter 102 can transmit over antenna 106 on the first channel while second receiver 112 receives another signal on the second channel from antenna 106. Similarly, second transmitter 104 can transmit over antenna 106 on the second channel while first receiver 110 receives another signal on the first channel from antenna 106. As described above, concurrent operation of both first transmitter 102 and second transmitter 104 is also possible, although neither first receiver 110 nor second receiver 112 would be able to receive on the first or second frequency during that time. Likewise, concurrent operation of both receiver 110 and receiver 112 is also possible, however, neither first transmitter 102, nor second transmitter 104 would be able to transmit on the first or second frequency during that time.

Although in this embodiment, transmitters 102 and 104 and receivers 110 and 112 are described as operating at a single frequency, the present inventions is not intended to be so limited. For example, in another embodiment, each transmitter 102 and 104 and each receiver 110 and 112 are adjustable such that each can operate at any channel within a specified frequency band. In this alternative embodiment, first transmitter 102 and first receiver 110 are tuned together such that first transmitter 102 and first receiver 110 operate on the same channel. Likewise, second transmitter 104 and second receiver 112 are also tuned together. In other embodiments, a push-to-talk system is not used, thus each transmitter/receiver pair are not tuned to the same frequency. Also, although FIG. 1 illustrates an embodiment having two transmitters and two receivers, other embodiments having more than two transmitters and receivers are contemplated as within the scope of embodiments of the present inventions.

As would be appreciated by one of ordinary skill in the art upon reading this specification, the quality of components available for realizing apparatus 100 can vary significantly. For example, as described above, transmit/receive signal duplexer 116 operates to provide signal isolation functionality such that signals received on Port C are passed to Port A for output, and ideally, none of that signal will appear at Port B. The degree of signal isolation actually provided between Port C and Port B will be greater for higher quality devices than lower quality devices. That is, a lower quality device will allow relatively more "leakage" of a signal received on Port C to appear on Port B when compared to a higher quality device. This is also true with respect to leakage appearing on Port C when a signal is received on Port A of transmit/receive signal duplexer 116. One of ordinary skill in the art upon reading this specification would also appreciate that the quality of the device used to implement antenna 106 and any interconnect devices such as cables are also relevant with respect to the amount of a signal which is reflected back to Port A of transmit/receive signal duplexer 116. Both of these potential leakage paths, and means for addressing them, are discussed is greater detail below.

Figure 2:
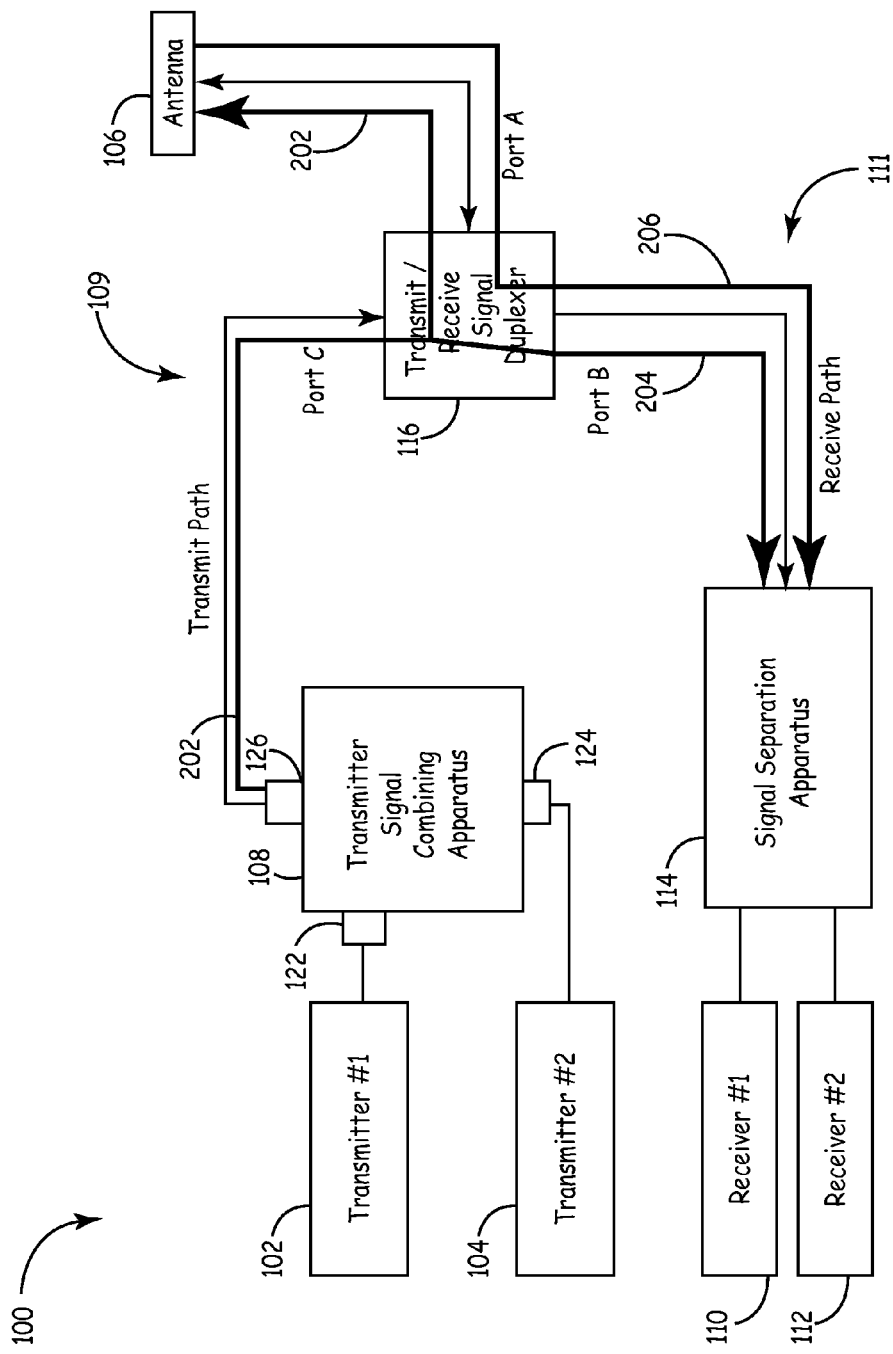
FIG. 2 is a block diagram of the embodiment shown in FIG. 1 illustrating transmit and leakage signal paths.

FIG. 2 is a block diagram of apparatus 100 illustrating the two common potential leakage paths of the transmit signal into receive path 111. Line 202 represents the path of the transmit signal as it propagates from transmitter signal combining apparatus 108 through transmit/receive signal duplexer 116 and onto antenna 106. Line 204 represents direct leakage which occurs as signals from transmit path 109 are coupled directly into receive path 111 against the isolation of transmit/receive signal duplexer 116. Line 206 represents reflected leakage which is a component of the transmit signal that reflects off of antenna 106 and into receive path 111. Both direct leakage 204 and reflected leakage 206 result in a transmit signal component in the receive signal.

Direct leakage 204 results from a signal leakage traveling from Port C to Port B. As explained above, a transmit/receive signal duplexer having 100% isolation from Port C to Port B would not transfer any energy from transmitted signal 202 to Port B. However, in some applications, less than 100% isolation is achieved.

Reflection leakage 206 is caused when transmit signal 202 propagates onto antenna 106 and any interconnect devices such as cables, and some of the energy from transmit signal 202 is reflected backwards and into Port A of transmit/receive signal duplexer 116. As explained above if antenna 106 and any interconnect devices are perfectly matched with transmit/ receive signal duplexer 116, no energy from transmitted signal 202 is reflected backwards down antenna 106. In some applications, however, antenna 106 and any interconnect devices are not perfectly matched, and an amount of energy is reflected, propagating into receive path 111. Reflected leakage 206 travels down antenna 106 into Port A and is coupled by transmit/receive signal duplexer 116 to Port B and into receive path 111. The more energy reflected by antenna 106 and any interconnect devices, the greater the amount of reflected leakage 206 that will occur. In most applications, reflected leakage 206 is the main source of leakage from transmitted signal 202 onto receive path 111. Unlike direct leakage 204 which has a large loss (~20 dB) when the signal propagates on a reverse path through transmit/receive signal duplexer 116, reflected leakage 206 looks similar to a receive signal at transmit/receive signal duplexer 116 and thus travels through transmit/receive signal duplexer 116 with a low loss. This can result in noise of a relatively high power in receive path 111.

As alluded to above, a well matched antenna and/or a high isolation transmit/receive signal duplexer as described above with respect to FIGS. 1 and 2 is not always available or practical for some situations. Thus, FIGS. 3-7 below illustrate other embodiments which compensate for direct leakage 204 and reflected leakage 206 of transmit signal 202, as well as other noise in receive path 111.

Figure 3:
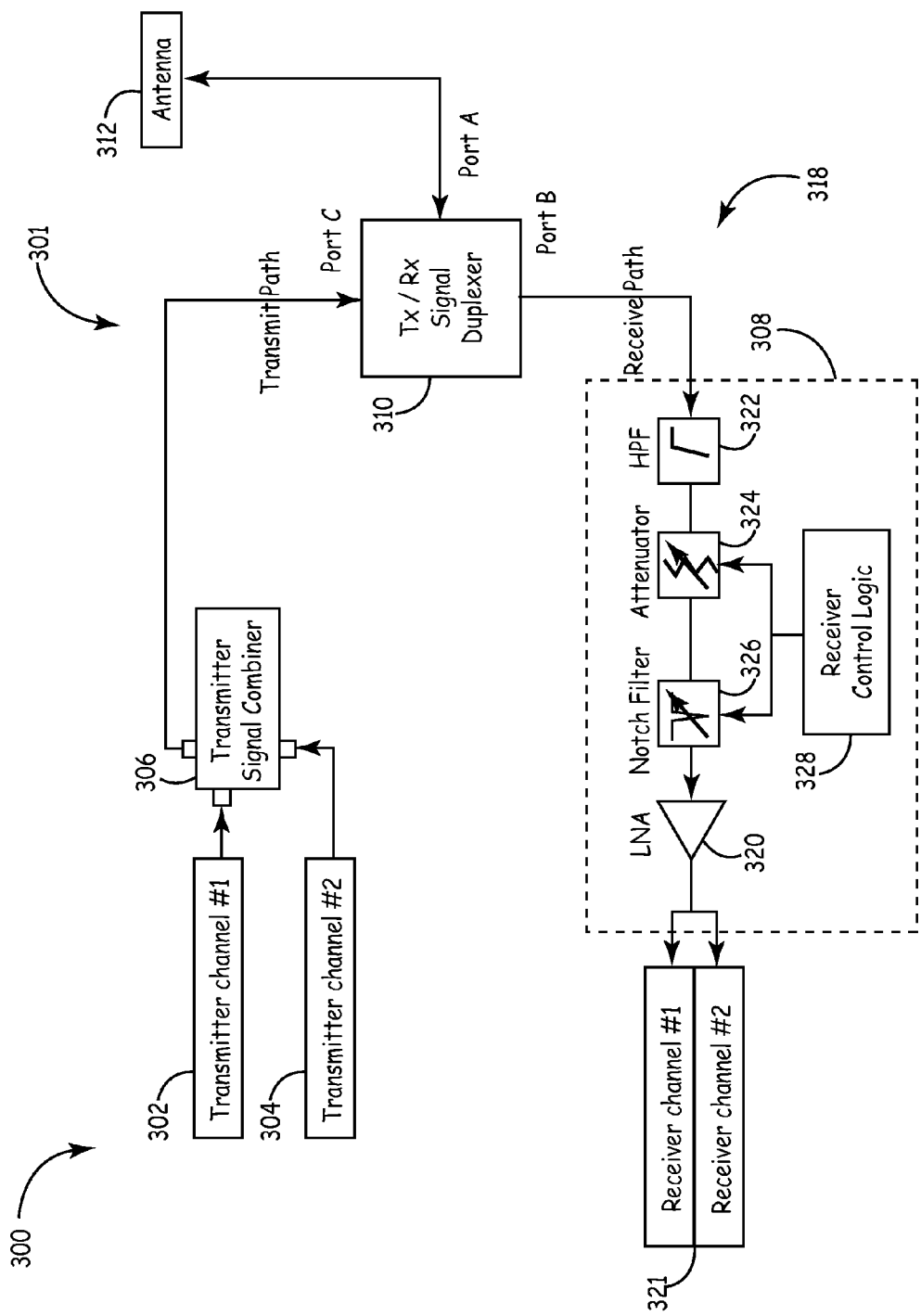
FIG. 3 is a block diagram of another apparatus for transmitting and receiving multiple frequencies over a single antenna of one embodiment of the present inventions.

FIG. 3 is a block diagram of one embodiment of another apparatus 300 for transmitting and receiving multiple radio signals over a single antenna that addresses direct leakage 202 and reflected leakage 206. Apparatus 300 includes a transmit path, shown generally at 301, having a first transmitter 302, a second transmitter 304, and a transmitter signal combining apparatus 306, each of which operates similar to their respective components in apparatus 100. In this embodiment, transmitters 302 and 304 are tunable to different frequencies within a defined frequency band. Transmit path 301 generates and processes a signal for transmission over antenna 312. Apparatus 300 also includes a receive path, shown generally at 318, for processing and receiving signals from antenna 312 and for compensating for leakage from transmit path 301 as is discussed in greater detail below. Similar to apparatus 100, apparatus 300 includes a transmit/receive signal duplexer 310 for coupling signals from transmit path 301 to antenna 312 and for coupling signals from antenna 312 to receive path 318.

Apparatus 300 illustrates an alternative receiver design to that of apparatus 100. In this embodiment, receive path 318 uses a wideband receiver 321 to processes the entire received bandwidth as one signal. Thus, instead of a separate receiver for each channel, receiver 321 is a single unit which is tunable to the desired frequency or frequencies, i.e. first and/or second, to receive signals on the channel(s). Advantageously, processing the receive signal in wideband reduces splitting loss, because the receive signal does not need to be split prior to processing by receiver 321.

In this embodiment, signal separation apparatus 308 operates as the front end of receiver 321. Signal separation apparatus 308 includes a low noise amplifier 320 (LNA), a high pass filter 322, a variable attenuator 324, a notch filter 326, and receive control logic 328 to compensate for leakage and/or other noise in the receive signal. In operation, the receive signal is coupled from antenna 312 to receive path 318 by transmit/receive signal duplexer 310. Then, the receive signal FM components in the receive signal are rejected by high pass filter 322. After high pass filter 322, the receive signal travels through variable attenuator 324 and notch filter 326 to reject an interference signal, including leakage noise, from transmitters 302 and 304 as well as other interference. Variable attenuator 324 and notch filter 326 are tuned by receiver control logic 328 to attenuate and filter a desired frequency or frequencies. For example, when first transmitter 302 is transmitting on a first frequency, receiver control logic 328 tunes notch filter 326 to reject components on the receive signal of the first frequency. Variable attenuator 324 is tuned to provide additional reduction in interference to notch filter 326. Additionally, when receiver 321 is receiving on both channels, notch filter 326 can be set outside the band of either channel to reduce other noise signals in receive path 318. In another state, when both transmit channels are active, there is nothing to receive, and variable attenuator 324 is set to block all signals of the frequency of transmitters 302 and 304. This protects receiver 321 from the potentially strong transmitter leakage signals. In this state, tunable notch filter has no impact. After a receive signal passes through notch filter 326 the receive signal is amplified by LNA 320 and sent to receiver 321. Receiver 321 is then tuned the desired reception channel and processes the receive signal.

Figure 4:
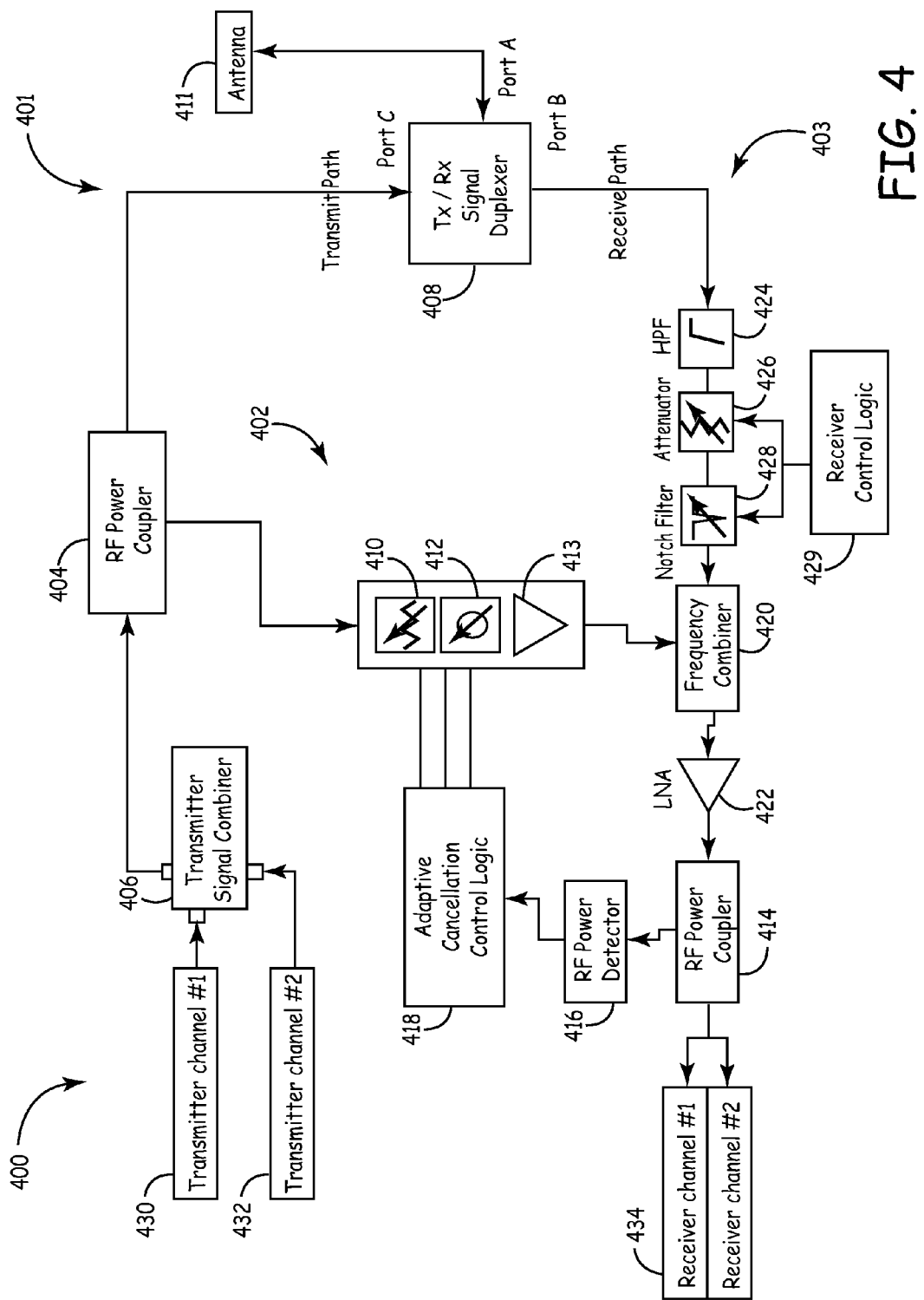
FIG. 4 is a block diagram of another apparatus for transmitting and receiving multiple frequencies over a single antenna of one embodiment of the present inventions.

FIG. 4 illustrates one embodiment of another apparatus 400 for transmitting and receiving multiple radio signals over a single antenna that addresses direct leakage 204 and reflected leakage 206. Apparatus 400 is similar in function to apparatus 300, except apparatus 400 further includes a transmitter suppressor shown generally at 402 for canceling leakage from the transmit signal that is coupled into the receive signal. Apparatus 400 includes a transmit path, shown generally at 401, having a first transmitter 430, a second transmitter 432, and a transmitter signal combining apparatus 406, each of which operates similar to their respective components in apparatus 100. Transmit path 401 generates and processes a signal for transmission over antenna 411. Apparatus 400 also includes a receive path, shown generally at 403, for processing and receiving signals from antenna 411. Similar to apparatus 100, apparatus 400 includes a transmit/receive signal duplexer 408 for coupling signals from transmit path 401 to antenna 411 and for coupling signals from antenna 411 to receive path 403.

In this embodiment, transmitter suppressor 402 adaptively cancels out components of transmitted signals that leak into receive path 403. Transmitter suppressor 402 includes a transmit RF power coupler 404 which is placed between a transmitter signal combining apparatus 406 and a transmit/receive signal duplexer 408 on a transmit path 401. Transmit RF power coupler 404 samples the transmit signal and outputs a reference signal based on the transmit signal. The reference signal is adjusted by a variable attenuator 410, a variable phase shifter 412, and a fixed gain amplifier 413. These signal processing components modify the reference signal to be equal in amplitude but opposite in phase to the transmit signal component in receive path 403. Variable attenuator 410 reduces the power of the reference signal such that the amplitude of the reference signal after it passes through phase shifter 412, fixed gain amplifier 413 and frequency combiner 420 matches the power of a leakage signal in receive path 403. In this embodiment, variable attenuator 410 is an electronically variable resistor. Variable phase shifter 412 adjusts the phase of the reference signal so that the reference signal is opposite in phase to the leakage signal in receive path 403. Thus, when reference signal is similar in power, but opposite in phase to the leakage signal in receive path 403, the reference signal can be used to cancel out the leakage signal.

In this embodiment, transmitter suppressor 402 operates with a feedback loop by sampling the receive signal to obtain uncancelled noise. Transmitter suppressor 402 samples the receive signal with a receive path RF power coupler 414.

Receive path RF coupler 414 samples the receive signal after insertion, if any, of the reference signal into receive path 403. During normal operation of transmitter suppressor 402, receive path 403 is sampled after insertion of reference signal, however, during startup of transmitter suppressor 402, no reference signal may have been inserted into receive path 403. Receive path RF coupler 414 sends the sampled signal to an associated RF power detector 416. RF power detector 416 measures the strength of the transmit signal component(s) in the receive signal. RF power detector 416 then feeds adaptive cancellation logic 418 with the results of the measurement, and adaptive cancellation logic 418 uses these results to set the phase and amplitude adjustments made on the reference signal by variable attenuator 410 and variable phase shifter 412. Once the reference signal has been adjusted, the reference signal is inserted into receive path 403 by a frequency combiner 420. Frequency combiner 420 is inserted in receive path 403 just before a low noise amplifier (LNA) 422. In one embodiment, frequency combiner 420 is another RF power coupler. The receive signal is processed by a high pass filter 424, a variable attenuator 426, and tunable notch filter 428 before the signal is adjusted by frequency combiner 420. Attenuator 426 and tunable notch filter 428 are controlled by a receiver control logic 429 similar to that of apparatus 300.

In one embodiment, transmitter suppressor 402 iteratively adjusts the reference signal until sufficient cancellation of transmit leakage occurs. The iterative process begins once the reference signal is inserted into receive path 403. When the modified receive signal (including the reference signal) reaches receive path RF coupler 414, the modified receive signal is sampled. Then, RF power detector 416 again measures the strength of transmit signal component(s) in the receive signal and feeds adaptive cancellation logic 418 with the results of the measurement. Adaptive cancellation logic 418 uses the measurements to modify the phase and/or amplitude adjustments made on the reference signal. Thus, the reference signal is adjusted to provide sufficient phase and amplitude adjustment of the reference signal to cancel out the transmitter leakage signal in the receive signal. In this way the modified reference signal cancels out a component of transmitter leakage signal in receive path 403 while having little impact on the desired receive signal.

Although apparatus 400 is shown as having two transmitters and two receivers, the present inventions is not intended to be so limited and can include more than two transmitters and receivers. For example, in another embodiment, three transmitters and three receivers are used. In this alternative embodiment, transmitter suppressor 402 operates to cancel out two frequency components in the receive signal when two transmitters are transmitting.

Figure 5:
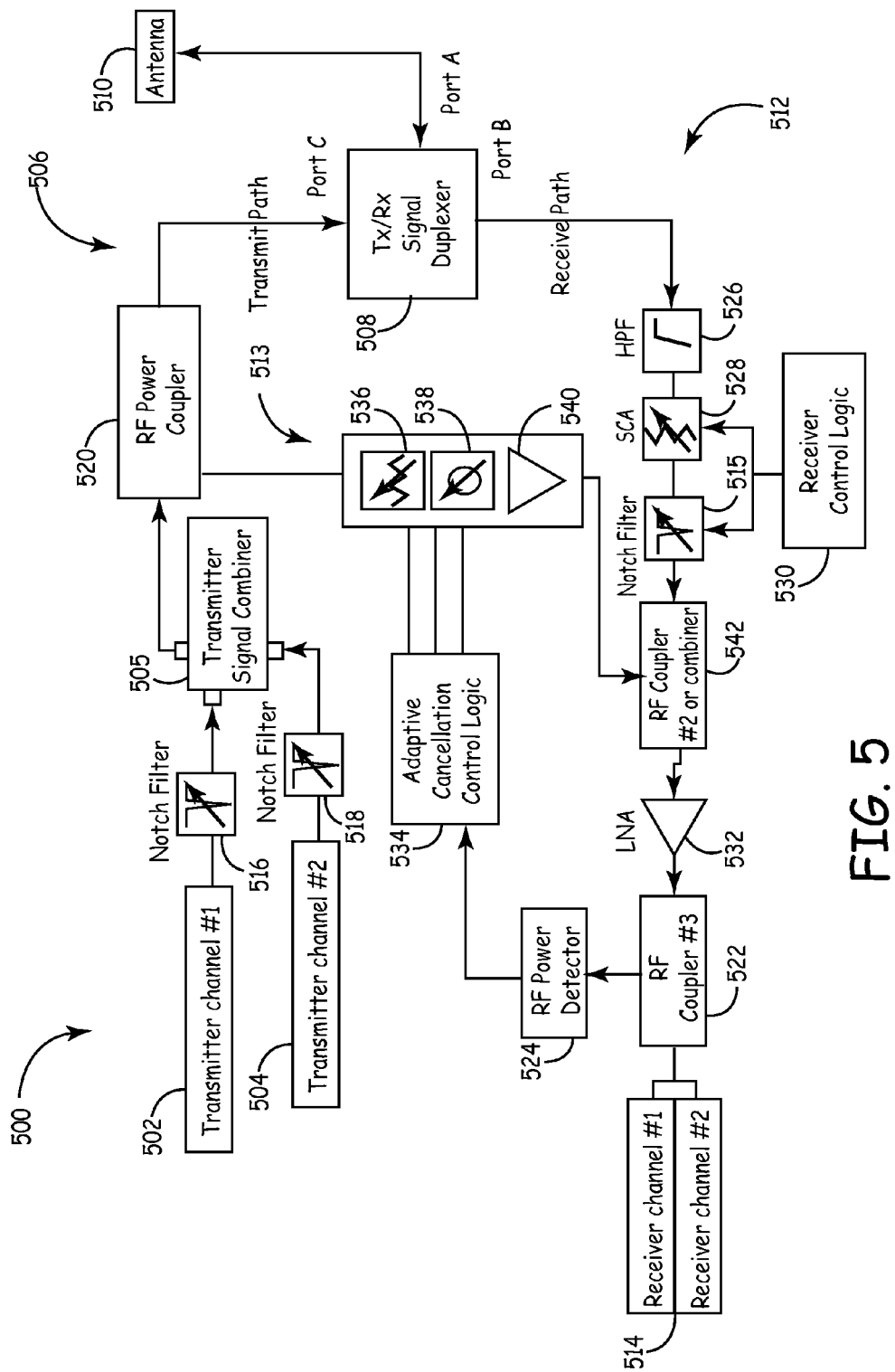
FIG. 5 is a block diagram of another apparatus for transmitting and receiving multiple frequencies over a single antenna of one embodiment of the present inventions.

FIG. 5 is a block diagram of one embodiment of another apparatus 500 for transmitting and receiving multiple radio signals over a single antenna that addresses direct leakage 204 and reflected leakage 206. Apparatus 500 is similar in function to apparatus 400 except that apparatus 500 compensates for broadband noise coming from transmitters 502 and 504. Apparatus 500 includes a transmit path, shown generally at 506, having a first transmitter 502, a second transmitter 504, and a transmitter signal combining apparatus 505, each of which operates similar to their respective components in apparatus 400. Transmit path 506 generates and processes a signal for transmission over antenna 510. Apparatus 500 also includes a receive path, shown generally at 512 for processing and receiving signals from antenna 510. Similar to apparatus 400, apparatus 500 includes a transmit/receive signal duplexer 508 for coupling signals from transmit path 506 to antenna 510 and for coupling signals from antenna 510 to receive path 512.

Receive path 512 of apparatus 500 includes a high pass filter 526, a variable attenuator 528, a receiver control logic 530, and a low noise amplifier 532 which operate with notch filter 515 to process the receive signal before the signal is processed by receiver 514. Additionally, apparatus 500 includes a transmitter suppressor 513 for canceling out leakage from transmit path 506. Transmitter suppressor 513 includes a RF power coupler 520, a receive path RF coupler 522, an RF power detector 524, adaptive cancellation logic 534, a variable attenuator 536, a variable phase shifter 538, a fixed gain amplifier 540, and a frequency combiner 542.

As would be appreciated by one of ordinary skill in the art upon reading this specification, the quality of components available for realizing apparatus 500 can vary significantly. For example, in this embodiment, transmitters 502 and 504 each produce and transmit broadband noise along with the desired transmit signal. The broadband noise is produced unintentionally as a byproduct of signal production in transmitters 502, and 504. A portion of the broadband noise produced by transmitters 502 and 504 occurs on the frequency of the other transmitter 504 or 502. For example, in one embodiment, when first transmitter 502 is transmitting over a first channel, first transmitter 502 creates a spectrum of noise surrounding the frequency of the first channel. A portion of this noise spectrum intrudes onto the operating frequency used for a second channel. The portion of the noise that is on the second channel may, travel down transmit path 506 through transmit/receive signal duplexer 508 and generate reflected leakage from antenna 510. This reflected noise will then enter receive path 512 and intrude on the frequency spectrum of the second channel. When receiver 512 is receiving on the second channel, this broadband noise cannot be easily cancelled by a transmitter suppressor 513 or a notch filter in receive path 512, such as notch filter 515. This is because the broadband noise is in the same frequency band as the receive channel and therefore, receive path 512 cannot distinguish such in-channel noise from the receive signal on the second channel.

To reduce this in-channel noise, apparatus 500 includes a notch filter 516, 518 as part of signal processing elements in each transmitter 502 and 504. Each notch filter 516 and 518 rejects broadband noise generated from its associated transmitter that intrudes into the frequency spectrum used by the other transmitter. For example, when first transmitter 502 is transmitting on channel #1, notch filter 516 rejects the broadband noise from transmitter 502 on the frequency of operation of channel #2. Thus, the broadband noise from first transmitter 502 is reduced and there is less noise on channel #2 for receiver 514. Likewise, notch filter 518 rejects noise from second transmitter 504 on channel #1. Thus, notch filters 516 and 518 enable a higher sensitivity at receiver 514.

Although in this embodiment, system 500 is shown with two transmitters and two receivers, the present inventions is not intended to be so limited and can include more than two transmitters and receivers. Thus, in another embodiment, three transmitters and three receiver channels are used. In this embodiment, each transmitter is followed by two notch filters. Each notch filter filters out noise from one of channels of the other two transmitters.

Figure 6:
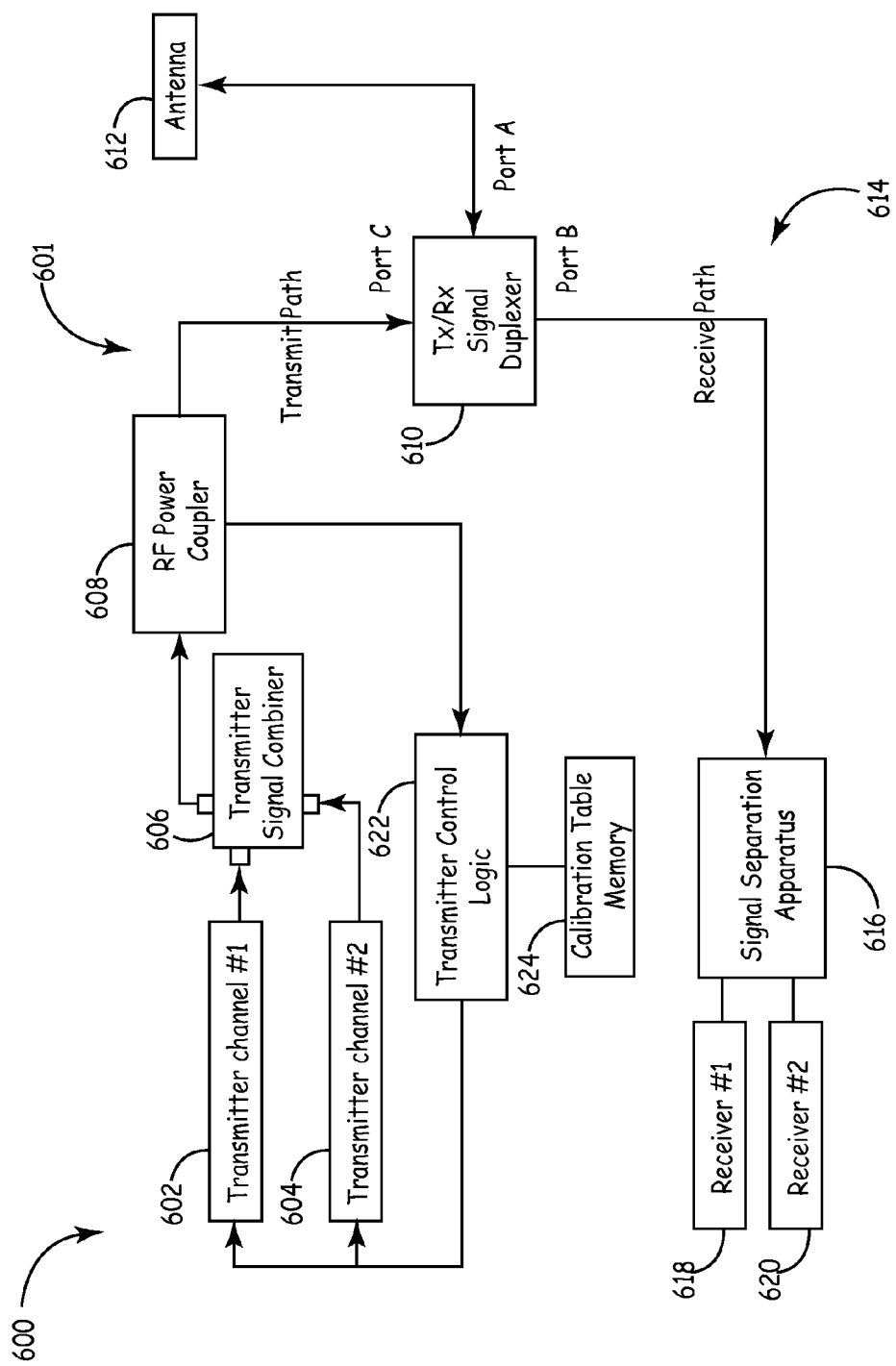
FIG. 6 is a block diagram of another apparatus for transmitting and receiving multiple frequencies over a single antenna of one embodiment of the present inventions.

Referring now to FIG. 6, one embodiment of another apparatus 600 for transmitting and receiving multiple radio signals over a single antenna is shown. Apparatus 600 is similar to apparatus 100 except apparatus 600 includes a transmitter signal combining apparatus 606 having a defined operational bandwidth in which it can efficiently sum signals. Apparatus 600 includes a transmit path 601 having a first transmitter 602, second transmitter 604. Apparatus 600 also includes a transmit/receive signal duplexer 610, and an antenna 612. Finally, apparatus 600 includes a receive path 614 having a signal separation apparatus 616, a first receiver 618, and a second receiver 620. Transmitters 602 and 604, transmit/receive signal duplexer 610, antenna 612, signal separation apparatus 616, and receivers 618 and 620 operate similar to their respective components in FIG. 1.

Outside of the operational bandwidth of transmitter signal combining apparatus 606, a power roll off occurs in which signals sent through transmitter signal combining apparatus 606 incur an increased power loss. Because transmitters 602 and 604 can be tuned to different frequencies, transmitters 602 and 604 may transmit outside of the operational bandwidth of transmitter signal combining apparatus 606. This can cause a mismatch in the transmitted power of transmitters 602 relative to the transmitted power of transmitter 604. A power mismatch between transmitters 602 and 604 can lead to transmit signals reaching antenna 612 outside of a preferred range of power levels of apparatus 600.

To compensate for the power roll off of transmitter signal combining apparatus 606, an RF power coupler 608 and a transmitter control logic 622 are used to calibrate transmitters 602 and 604 to maintain the power of the transmitted signal within the preferred range of power levels of apparatus 600. RF power coupler 608 is inserted in transmit path 601 between the transmitter signal combining apparatus 606 and transmit/receive signal duplexer 610. RF power coupler 608 samples the transmit signal on transmit path 601 after the signal leaves transmitter signal combining apparatus 606. RF power coupler 608 then sends the sampled signal to transmitter control logic 622. Transmitter control logic 622 takes data from the sampled signal and stores the data in an associated calibration table memory 624. Transmitter control logic 622, then uses the data in calibration table memory 624 to control the power of first transmitter 602 and second transmitter 604 to compensate for power roll of transmitter signal combining apparatus 606. Additionally, the data in calibration table memory 624 is used by transmitter control logic 622 next either transmitter 602 and 604 is set to a frequency in which data has been taken.

Figure 7:
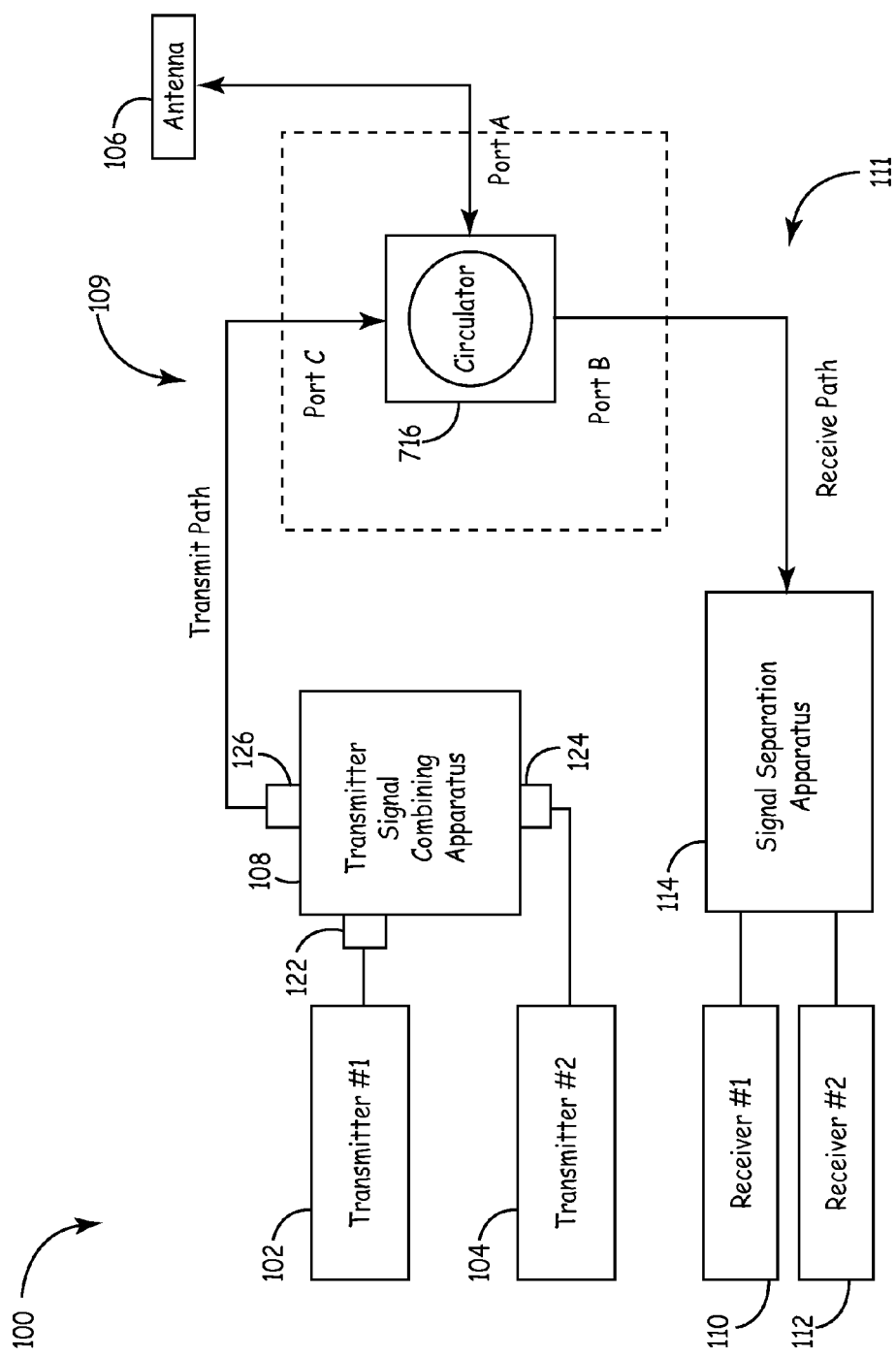
FIG. 7 is a block diagram of another apparatus for transmitting and receiving multiple frequencies over a single antenna of one embodiment of the present inventions.

Referring now to FIG. 7, one embodiment of another apparatus 700 for transmitting and receiving multiple radio signals over a single antenna is shown wherein transmit/receive signal duplexer is a directional three port circulator 716. Three port circulator 716 is a magnetic polarized directional switch that provides coupling between two ports by rotating a signal received at one port to an adjacent port. For example, circulator 716 is polarized in a clockwise direction such that when a signal is received at one port the signal is coupled to the adjacent port that that is in the clockwise direction from the port of input. Additionally, the signal received at the port of input is isolated from the adjacent port in the counter-clockwise direction. For example, in this embodiment, circulator 716 takes signals received at Port A and directs them with minimal resistance to Port B, while limiting any coupling from Port A and Port C. Likewise, signals received at Port B of the circulator 716 are directed to Port C, and isolated to Port A. Additionally, signals received on Port C are directed to Port A, and isolated to Port B. Advantageously, the directional design of a circulator 716 allows signals from transmitters 102 and 104, to propagate with minimal loss to antenna 106, while rejecting a large amount of transmit signal leakage into receive path 111. In one embodiment, isolation between Port C and Port B achieves a 20 dB drop in signal strength.

Figure 8:
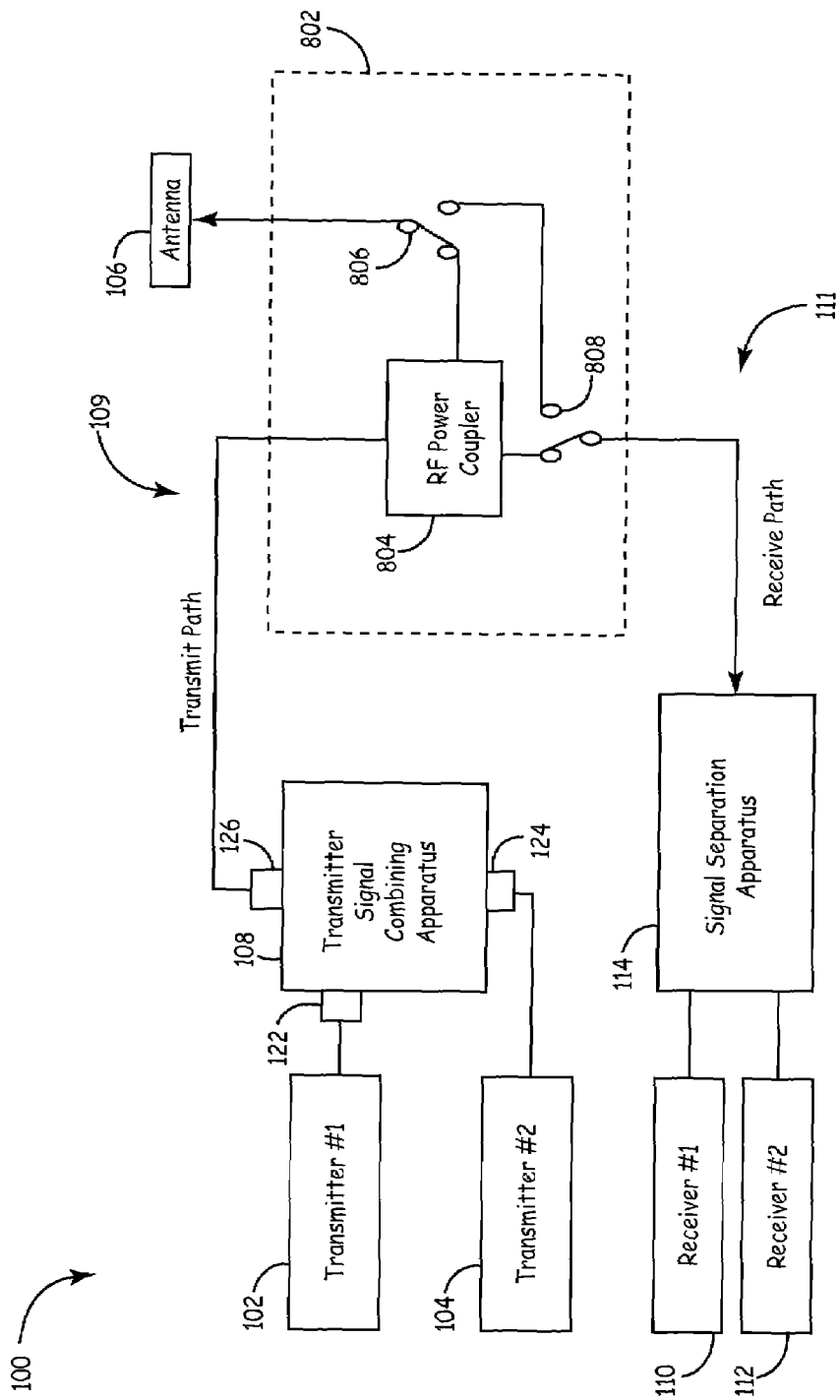
FIG. 8 is a block diagram of another apparatus for transmitting and receiving multiple frequencies over a single antenna of one embodiment of the present inventions.

Referring now to FIG. 8, one embodiment of another apparatus 800 for transmitting and receiving multiple radio signals over a single antenna is shown wherein transmit/receive signal duplexer is a switch network 802. Switch network 802 includes an RF directional coupler 804, a first switch 806, and a second switch 808. Switch network 802 sends transmit signal to antenna 106 with minimal loss in the forward (transmit path 109 to antenna 106) direction. RF power coupler 804 couples signals received at antenna 106 to receive path 111. Additionally, RF power coupler 804 isolates signals from transmit path 109 to receive path 111. When both transmitters 102 and 104 are idle (i.e. apparatus 100 is in receive mode), RF power coupler 804 switches 806 and 808 are switched to connect antenna 106 directly to receive path 111, thus providing minimal loss to receive path 111. When at least one transmitter 102 and 104 is transmitting, however, switches 806 and 808 are switched to connect antenna 106 to RF power coupler 804 as shown in FIG. 8.

Figure 9:
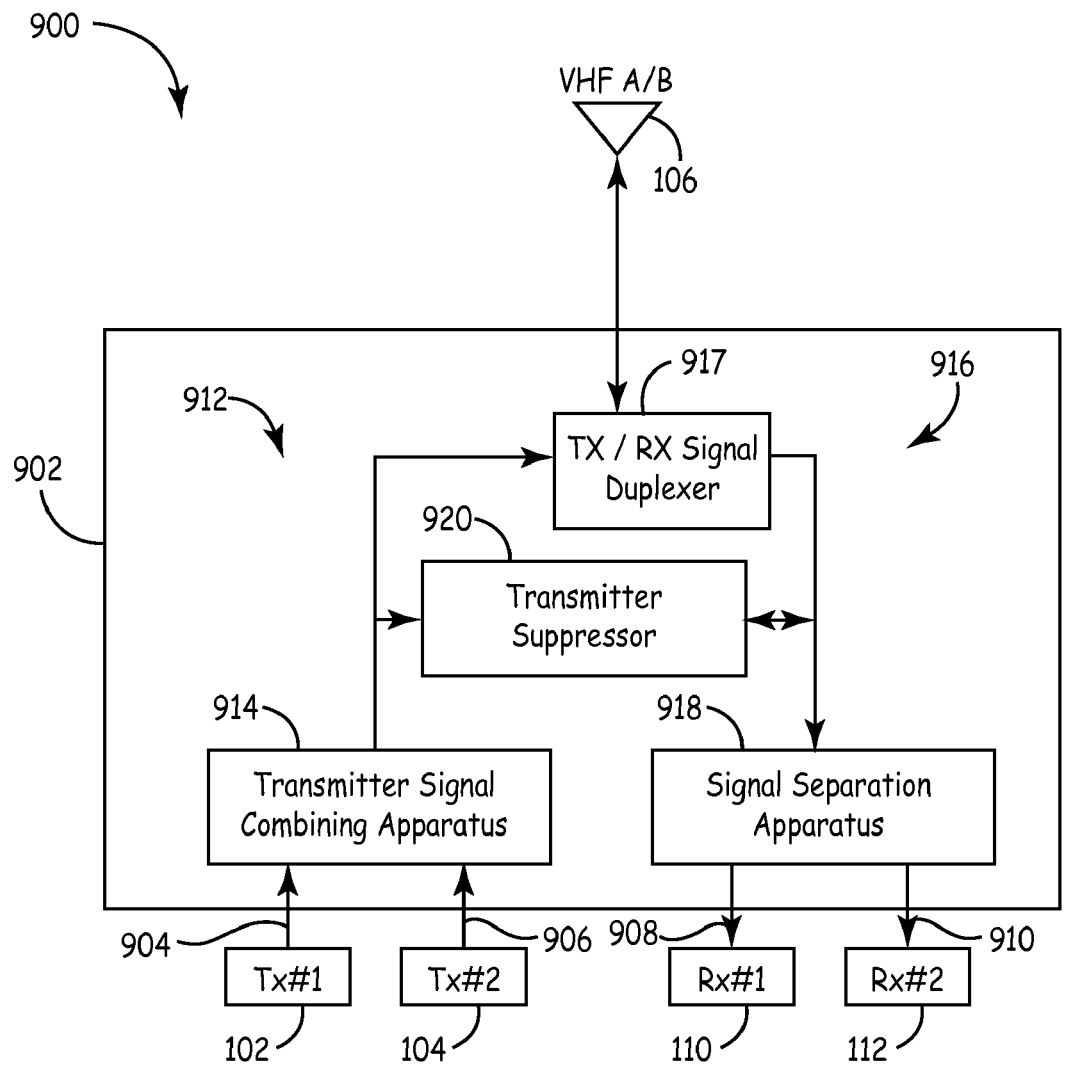
FIG. 9 is a block diagram of another apparatus for transmitting and receiving multiple frequencies over a single antenna of one embodiment of the present inventions.

FIG. 9 is a block diagram of one embodiment of a system 900 for transmitting and receiving multiple radio signals over a single antenna which comprises a line replaceable unit (LRU) 902. System 900 operates similar in function to apparatuses 100 and 400, however, some of the components of system 900 have been packaged into a LRU 902. Thus, system 900 includes first and second transmitters 102 and 104 for transmitting signals over antenna 106. System 900 also includes first and second receivers 110 and 112 for reception of signals from antenna 106. Advantageously, transmitters 102 and 104, receivers 110 and 112, and antenna 106 are located outside of LRU 902 which allows LRU 902 to be inserted and removed from an existing system and allows functionalities of the present inventions to be used with existing transmitter, receiver, and antenna designs.

LRU 902 provides easy repair, replacement, and insertion into existing or pre-designed communication systems of an apparatus for combination of multiple transmitters and receivers onto the same antenna. As shown LRU 902 is has two transmitter inputs 904, 906 (for coupling with respective transmitters 102 and 104, for example) and two receiver outputs 908 and 910 (for coupling with respective receivers 110 and 112, for example). LRU also has a connection for coupling with an antenna 106. In alternate embodiments, LRU 902 includes all the functionality of apparatus 100, 300, 400 and 500 that are provided by the various components between the transmitters, receivers, and antenna. For example, LRU 902 includes a transmit path 912 including a transmitter signal combining apparatus 914. LRU 902 also includes a receive path 916 including a signal separation apparatus 918. A transmit/receive signal duplexer 917 routes transmit path 912 signals to antenna 106 and routes signals received on antenna 106 to receive path 916. Coupled to both transmit path 912 and receive path 916 is a transmitter suppressor 920 that addresses direct leakage 204 and reflected leakage 206 using any of the means discussed above with respect to FIGS. 1-5 and below with respect to FIG. 7. As described with reference to the apparatuses above, system 900 and LRU 902 could be expanded to include more than two transmitters and receivers, or to use with a wideband receiver.

Figure 10:
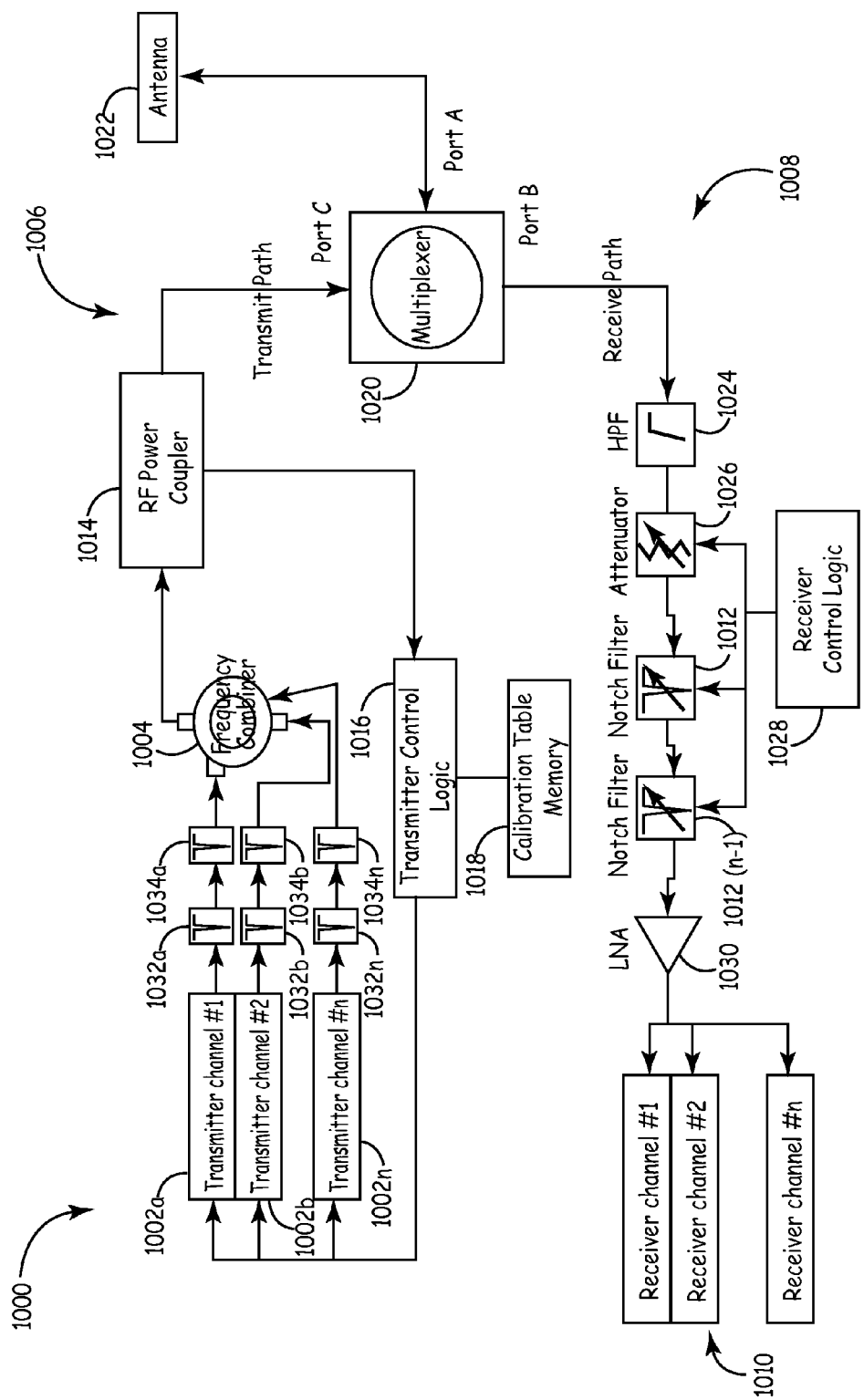
FIG. 10 is a block diagram of another apparatus for transmitting and receiving multiple frequencies over a single antenna of one embodiment of the present inventions.

FIG. 10 is a block diagram of one embodiment of another apparatus 1000 for transmitting and receiving multiple radio signals over a single antenna that addresses direct leakage 204 and reflected leakage 206. Apparatus 1000 is similar in function to apparatus 300, except that apparatus 1000 includes more than two transmitters and receivers. Transmitters 1002a, 1002b, and 1002n are coupled to a transmitter signal combining apparatus 1004 in transmit path 1006 and transmit over "n" channels (shown as channels #1, #2, and #n respectively). Likewise, in receive path 1008 receiver 1010 can tune to channel #1, #2, and #n. As represented by #n, the number of transmitters and receivers can be two, three, or more, however, each additional transmitter/receiver pair adds increased complexity to apparatus 1000. For example, receive path 1008 includes a number of notch filters equal to n−1. As shown, receive path 1008 includes first tunable notch filter 1012*a*, and at least one additional tunable notch filter 1012 (n−1) in receive path 1008. Thus, if all channels except one are being transmitted on and the leftover channel is being received on, one notch filter can be tuned to each of the transmit channels, thus rejecting any leakage on those channels in the receive signal. For example, when transmitter 1002*a* is transmitting on channel #1 and transmitter 1002*n* is transmitting on channel #n, notch filter 1012*a* is tuned to channel #1 and notch filter 1012 (n−1) is tuned to channel #n. This rejects frequency components of channel #1 and #n, and allows receiver 1010 to receive on channel #2. Additionally, apparatus 1000 includes (n−1) notch filters coupled to each transmitter 1002*a*, 1002*b*, 1002*n*. As shown, n=3, and thus each transmitter is followed by two notch filters. For example, transmitter 1002*a* is followed by notch filter 1032*a* and 1034*a*. Notch filter 1032*a* filters out the frequency of transmitter 1002*b* and 1034*a* filters out the frequency of transmitter 1002*n*. Likewise, notch filters 1032*b* and 1034*b* filter out the frequency of transmitters 1002*a* and 1002*n*. Finally, notch filters 1032*n* and 1034*n* filter out the frequency of transmitters 1002*a* and 1002*b*.

Apparatus 1000 also includes RF power coupler 1014, transmitter control logic 1016, and calibration table memory 1018 for adjusting transmitters 1002*a*, 1002*b*, and 1002*n* similar to RF power coupler 608, transmitter control logic 622, and calibration table memory 624 of apparatus 600. Likewise, apparatus 1000 includes a transmit/receive signal duplexer 1020 to direct signals to and from an antenna 1022. Finally, in receive path 1008, apparatus 1000 includes a high pass filter 1024, a variable attenuator 1026, a receiver control logic 1028, and a low noise amplifier 1030 which operate with notch filters 1012 and 1012 (n−1) to process the receive signal before the signal is processed by receiver 1010.

Referring now to FIG. 11, a flow diagram of one embodiment of a method 1100 of transmitting and receiving multiple frequencies simultaneously on a single antenna is shown. The method begins at 1102 with receiving an RF signal (receive signal) of a first frequency over an antenna (1102) and processes the signal at a receiver. Over the same antenna a transmitter transmits another RF signal (transmit signal) of a second frequency (1104). In one embodiment, to prevent the transmit signal from masking the receive signal at the receiver, a transmit/receive signal duplexer limits the amount of the transmit signal that couples into the receive signal. The transmit/receive signal duplexer couples both the transmitter and the receiver to the antenna, and limits the amount of coupling between the transmit and receive signals.

Occasionally, a component of the transmit signal is still coupled into the receive signal as leakage noise. Thus, additional techniques are needed to further prevent the transmit signal from masking the receive signal. One such technique monitors the transmit signal to obtain a reference signal (1106). In one embodiment, the receive signal is also monitored to obtain feedback from the receive signal. In one embodiment, the feedback is uncancelled noise which is measured from the receive signal. The uncancelled noise from the receive signal is then used to adjust the reference signal. The reference signal is applied to the receive signal to cancel at least part of the leakage noise in the receive signal (1108). In one embodiment, the steps of monitoring the transmit signal (1106), monitoring the receive signal, adjusting the reference signal, and canceling at least part of the leakage noise can be repeated in an iterative process to fine tune the cancellation if desired.

Another technique to prevent the transmit signal from masking the receive signal is to reject any component of the transmit frequency in the receive signal. For example, in one embodiment, a notch filter in the receive path placed in the receive path is set to reject all components from at the transmit frequency in the receive path. Thus, potentially high powered signal from the transmitter(s) is reduced in the receive path.

Another method 1200 to improve reception in a system with multiple transmitters and receivers is shown in FIG. 12. Method 1200 begins with a receiver receiving a receive signal at a first frequency from an antenna (1202). While the receiver is receiving the receive signal, a transmitter is generating a transmit signal at a second frequency for transmission over the antenna (1204). Once the transmit signal is generated, a first frequency component is rejected from the transmit signal (1206). The modified transmit signal having the first frequency component rejected is then transmitted over the antenna (1208). Thus, if any leakage occurs of the transmit signal into the receive signal, the component which is currently being received by the receiver (i.e. the first frequency) has been rejected and will not couple into the receive path.

Figure 13:
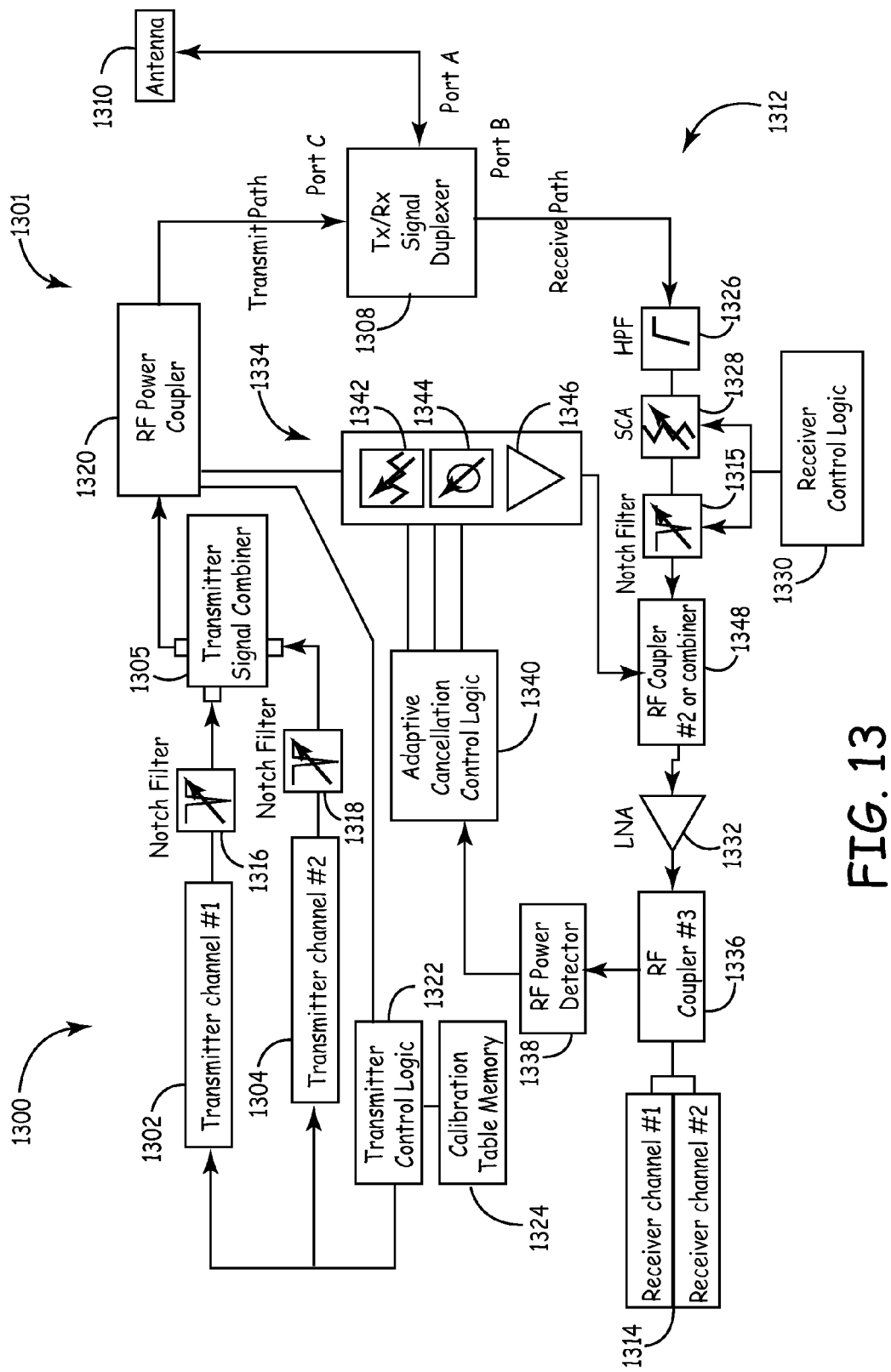
FIG. 13 is a block diagram of another apparatus for transmitting and receiving multiple frequencies over a single antenna of one embodiment of the present inventions.

FIG. 13 is a block diagram of one embodiment of another apparatus 1300 for transmitting and receiving multiple radio signals over a single antenna that combines aspects of the previous embodiments. Apparatus 1300 includes a transmit path, shown generally at 1301, having a first transmitter 1302, a second transmitter 1304, and a transmitter signal combining apparatus 1305, each of which operates similar to their respective components in apparatus 500. Transmit path 1301 generates and processes a signal for transmission over antenna 1310. Apparatus 1300 also includes a receive path, shown generally at 1312 for processing and receiving signals from antenna 1310. Similar to apparatus 500, apparatus 1300 includes a transmit/receive signal duplexer 1308 for coupling signals from transmit path 1301 to antenna 1310 and for coupling signals from antenna 1310 to receive path 1312.

In this embodiment, transmitters 1302 and 1304 each produce and transmit broadband noise along with the desired transmit signal. A portion of this broadband noise occurs on the frequency of the other transmitter 1302 or 1304. For example, in one embodiment, when first transmitter 1302 is transmitting over a first channel, first transmitter 1302 creates a spectrum of noise surrounding the frequency of the first channel. A portion of this noise spectrum intrudes onto the operating frequency used for a second channel. The portion of the noise that is on the second channel may, travel down transmit path 1301 through transmit/receive signal duplexer 1308 and generate reflected leakage from antenna 1310. This reflected noise will then enter receive path 1312 and intrude on the frequency spectrum of the second channel. When receiver 1312 is receiving on the second channel, this broadband noise cannot be easily cancelled by a transmitter suppressor or a notch filter in receive path 1312, such as notch filter 1315. This is because the broadband noise is in the same frequency band as the receive channel and therefore, receive path 1312 cannot distinguish such in-channel noise from the receive signal.

To reduce this in-channel noise, apparatus 1300 includes a notch filter 1316, 1318 after each transmitter 1302, 1304. Each notch filter 1316 and 1318 rejects broadband noise generated from its associated transmitter that intrudes into the frequency spectrum used by the other transmitter. For example, when first transmitter 1302 is transmitting on channel #1, notch filter 1316 rejects the broadband noise from transmitter 1302 on the frequency of operation of channel #2. Thus, the broadband noise from first transmitter 1302 is reduced and there is less noise on channel #2 for receiver 1314. Likewise, notch filter 1318 rejects noise from second transmitter 1304 on channel #1. Thus, notch filters 1316 and 1318 enable a higher sensitivity at receiver 1314.

Apparatus 1300 also includes RF power coupler 1320, transmitter control logic 1322, and calibration table memory 1324 for adjusting transmitters 1302 and 1304 similar to RF power coupler 608, transmitter control logic 622, and calibration table memory 624 of apparatus 600. Likewise, in receive path 1312, apparatus 1300 includes a high pass filter 1326, a variable attenuator 1328, a receiver control logic 1330, and a low noise amplifier 1332 which operate with notch filter 1315 to process the receive signal before the signal is processed by receiver 1314.

Additionally, apparatus 1300 includes a transmitter suppressor 1334 for canceling out leakage from transmit path 1312. Transmitter suppressor 1334 uses RF power coupler 1320, and includes a receive path RF coupler 1336, an RF power detector 1338, adaptive cancellation logic 1340, a variable attenuator 1342, a variable phase shifter 1344, a fixed gain amplifier 1346, and a transmitter signal combining apparatus 1348.

Although in this embodiment, system 1300 is shown with two transmitters and two receivers, the present inventions is not intended to be so limited and can include more than two transmitters and receivers. Thus, in another embodiment, three transmitters and three receiver channels are used. In this embodiment, each transmitter is followed by two notch filters. Each notch filter filters out noise from one of channels of the other two transmitters. Additionally, in this embodiment an additional notch filter is added to receive path 1312.

Figure 14:
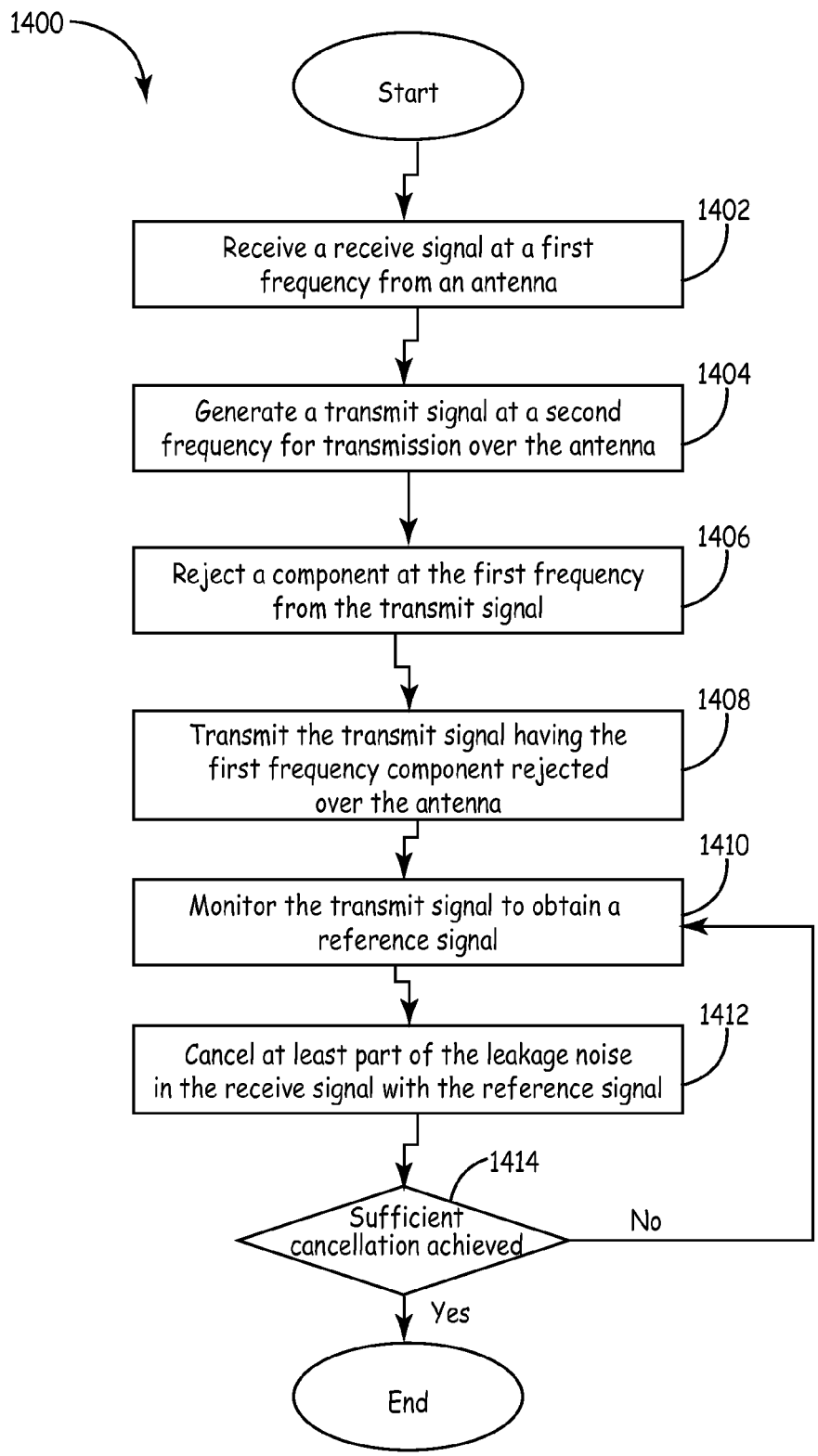
FIG. 14 is a flow chart of another method for transmitting and receiving multiple frequencies over a single antenna of one embodiment of the present inventions.

Referring now to FIG. 14, a flow diagram of one embodiment of a method 1400 of transmitting and receiving multiple frequencies simultaneously on a single antenna is shown. Method 1400 begins with a receiver receiving a receive signal at a first frequency from an antenna (1402). While the receiver is receiving the receive signal, a transmitter is generating a transmit signal at a second frequency for transmission over the antenna (1404). Once the transmit signal is generated, a first frequency component is rejected from the transmit signal (1406). The modified transmit signal having the first frequency component rejected is then transmitted over the antenna (1408). Thus, if any leakage occurs of the transmit signal into the receive signal, the component which is currently being received by the receiver (i.e. the first frequency) has been rejected and will not couple into the receive path.

Occasionally, a component of the transmit signal is still coupled into the receive signal as leakage noise. Thus, additional techniques are needed to further prevent the transmit signal from masking the receive signal. One such technique monitors the transmit signal to obtain a reference signal (1410). In one embodiment, the receive signal is also monitored to obtain feedback from the receive signal. In one embodiment, the feedback is uncancelled noise which is measured from the receive signal. The uncancelled noise from the receive signal is then used to adjust the reference signal. The reference signal is applied to the receive signal to cancel at least part of the leakage noise in the receive signal (1412). Next, the receive signal is checked to determine if sufficient cancellation has been achieved (1414). If not, the steps of monitoring the transmit signal (1410), monitoring the receive signal, adjusting the reference signal, and canceling at least part of the leakage noise (1412) can be repeated in an iterative process to fine tune the cancellation if desired. If sufficient cancellation has been achieved, then the process is finished.

It should be understood that methods 1100, 1200, and 1400 can operate using any of the above apparatuses as well as other apparatuses, having the components to achieve the steps as is known to those skilled in the art. Additionally, any of the above apparatuses and methods would work well on many types of vehicles including, but not limited to, aircraft, automobiles, military vehicles, helicopters, and commercial vehicles.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present inventions. Therefore, it is manifestly intended that this inventions be limited only by the claims and the equivalents thereof.

What is claimed is:

1. An apparatus for transmitting and receiving multiple radio frequencies simultaneously over a single antenna, the apparatus comprising:

a transmitter signal combining apparatus configured to communicatively couple with a plurality of transmitters, wherein the transmitter signal combining apparatus is configured to output a transmission signal based on any signals received from the plurality of transmitters;

at least one transmit/receive signal duplexer coupled to the transmitter signal combining apparatus and configured to provide the transmission signal to an antenna, wherein the antenna is also configured to sense an incoming radio frequency (RF) signal;

a front end of a plurality of receivers coupled to the at least one transmit/receive signal duplexer;

a signal suppressor configured to monitor the transmission signal and cancel at least a portion of a transmission signal component that has coupled to the incoming RF signal based on monitoring the transmission signal, wherein the signal suppressor cancels the at least a portion of a transmission signal component prior to an amplifier in the front end of the plurality of receivers;

wherein the at least one transmit/receive signal duplexer is further configured to provide the incoming RF signal to the signal suppressor, and limit a direct coupling of the transmission signal into the signal suppressor;

a tunable notch filter configured to have the incoming RF signal coupled therethrough after the incoming RF signal passes through the at least one transmit/receive signal duplexer, the tunable notch filter configured to reject a frequency of one of the plurality of transmitters that is currently transmitting, wherein the tunable notch filter is coupled to the incoming RF signal prior to the amplifier in the front end of the plurality of receivers; and a plurality of notch filters, each of the plurality of notch filters coupled to an output of one of the plurality of transmitters and configured to filter out a frequency of one of the plurality of receivers.

2. The apparatus of claim 1, wherein the at least one receiver receives incoming RF signals on at least a first frequency channel and a second frequency channel; and wherein a first transmitter of the plurality of transmitters generates signals using the first frequency channel, and wherein a second transmitter of the plurality of transmitters generates signals using the second frequency channel.

3. The apparatus of claim 1, further comprising:
a signal separation apparatus configured to split the incoming RF signal for distribution to at least a first receiver and a second receiver.

4. The apparatus of claim 1, further comprising:
an RF power coupler configured to measure an output of the transmitter signal combining apparatus;
a transmitter control logic coupled to the RF power coupler and the plurality of transmitters; and
wherein the transmitter control logic is configured to adjust a power of one or more of the plurality of transmitters based on information obtained by the RF power coupler.

5. The apparatus of claim 4, wherein the transmitter control logic is further configured to adjust a power of one or more of the plurality of transmitters based on information obtained by the RF power coupler to compensate for a power roll off of the transmitter signal combining apparatus.

6. The apparatus of claim 4, further comprising:
a calibration table memory, wherein the transmitter control logic is further configured to store information obtained by the RF power coupler into a calibration table memory.

7. The apparatus of claim 1, further comprising:
a variable attenuator coupled to the at least one transmit/receive signal duplexer, wherein the tunable notch filter is coupled to the variable attenuator;
a receiver control logic coupled to the variable attenuator and the tunable notch filter, wherein the receiver control logic tunes one or both of the variable attenuator and the tunable notch filter based on transmissions from the plurality of transmitters.

8. An apparatus for transmitting and receiving multiple frequencies on a single antenna comprising:
a transmitter signal combining apparatus configured to communicatively couple to a plurality of transmitters and to sum signals from the plurality of transmitters, the transmitter signal combining apparatus configured to communicatively couple to an antenna;
a signal suppressor configured to monitor a transmit signal from at least one of the plurality of transmitters to obtain a reference signal and cancel at least a portion of a transmit signal component in a receive signal based on transmissions from the plurality of transmitters;
a front end of a plurality of receivers coupled to the signal suppressor, wherein the signal suppressor cancels the at least a portion of a transmission signal component prior to an amplifier in the front end of the plurality of receivers;
wherein the receive signal is coupled from the antenna to the plurality of receivers, each of the plurality of receivers configured to receive at a frequency of one of the plurality of transmitters;
a tunable notch filter configured to have the receive signal coupled therethrough, the tunable notch filter configured to reject a frequency of one of the plurality of transmitters that is currently transmitting, wherein the tunable notch filter is coupled to the receive signal prior to the amplifier in the front end of the plurality of receivers; and
a plurality of notch filters, each of the plurality of notch filters coupled to an output of one of the plurality of transmitters and configured to filter out a frequency of one of the plurality of receivers.

9. The apparatus of claim 8, wherein the signal suppressor further comprises:
an adjustable phase shifter for adjusting the phase of the reference signal such that the adjusted reference signal substantially opposes a phase of the transmit signal component in the receive signal.

10. The apparatus of claim 9, wherein the signal suppressor further comprises:
an adaptive controller configured to monitor the receive signal and adjust the reference signal based on the receive signal.

11. The apparatus of claim 8, further comprising at least one transmit/receive signal duplexer coupled to the antenna and configured to provide the transmit signal from the combiner to the antenna, and further configured to provide the receive signal from the antenna to the plurality of receivers.

12. The apparatus of claim 11, wherein the signal suppressor further comprises:
a variable attenuator for adjusting the amplitude of the reference signal such that the adjusted reference signal is similar in power to the transmit signal component in the receive signal.

13. A method of transmitting and receiving multiple frequencies simultaneously on a single antenna, the method comprising:
receiving a receive signal at a first frequency over an antenna through a receive path via a transmit/receive signal duplexer coupled to the antenna, the receive path comprising a plurality of receivers coupled to the transmit/receive signal duplexer;
transmitting a transmit signal through a transmit path at a second frequency over the antenna, the transmit path comprising a plurality of transmitters coupled to a transmitter signal combining apparatus, wherein the transmitter signal combining apparatus is coupled to the transmit/receive signal duplexer;
monitoring the transmit signal in the transmit path to obtain a reference signal;
canceling from the receive path at least part of any leakage noise in the receive signal with the reference signal, wherein leakage noise is a portion of the transmit signal that is coupled into the receive signal; and
canceling from the transmit path, prior to the transmitter signal combining apparatus, noise in the transmit signal at the first frequency.

14. The method of claim 13, further comprising:
adjusting the reference signal based on feedback from the receive signal.

15. The method of claim 14, wherein adjusting adjusts a phase of the reference signal.

16. The method of claim 14, wherein adjusting adjusts an amplitude of the reference signal.

17. The method of claim 13, further comprising:
monitoring the receive signal to obtain uncancelled noise; and
adjusting the reference signal based on the uncancelled noise.

18. The method of claim 13, further comprising:
rejecting components of the second frequency in the receive signal.

* * * * *